(12) United States Patent
Baudouin et al.

(10) Patent No.: US 12,509,023 B2
(45) Date of Patent: Dec. 30, 2025

(54) CLEANING SYSTEM FOR A MOTOR VEHICLE

(71) Applicant: VALEO SYSTEMES D'ESSUYAGE, La Verriere (FR)

(72) Inventors: Maxime Baudouin, La Verriere (FR); Giuseppe Grasso, La Verriere (FR); Denis Thebault, La Verriere (FR); Yoann Dolle, La Verriere (FR); Adrien Peret, La Verriere (FR)

(73) Assignee: Valeo Systemes d'Essuyage

( * ) Notice: Subject to any disclaimer, the term of this patent is extended or adjusted under 35 U.S.C. 154(b) by 322 days.

(21) Appl. No.: 18/248,533

(22) PCT Filed: Sep. 24, 2021

(86) PCT No.: PCT/EP2021/076394
§ 371 (c)(1),
(2) Date: Apr. 11, 2023

(87) PCT Pub. No.: WO2022/083971
PCT Pub. Date: Apr. 28, 2022

(65) Prior Publication Data
US 2023/0382352 A1 Nov. 30, 2023

(30) Foreign Application Priority Data
Oct. 20, 2020 (FR) .................................. 2010771

(51) Int. Cl.
*B60S 1/48* (2006.01)
*B60S 1/50* (2006.01)
(Continued)

(52) U.S. Cl.
CPC ................. *B60S 1/481* (2013.01); *B60S 1/50* (2013.01); *B60S 1/52* (2013.01); *B60S 1/56* (2013.01)

(58) Field of Classification Search
None
See application file for complete search history.

(56) References Cited

U.S. PATENT DOCUMENTS 9,180,840 B2 11/2015 Tanaka et al.
2017/0258593 A1* 9/2017 Good .................. A61M 60/289
(Continued)

FOREIGN PATENT DOCUMENTS

CN 208585616 U * 3/2019
DE 3616737 C1 6/1987
(Continued)

OTHER PUBLICATIONS

Japan Patent Office, Office Action (with English translation) of corresponding Japanese Patent Application No. 2023-524210, dated Feb. 28, 2024.
(Continued)

*Primary Examiner* — Omair Chaudhri
(74) *Attorney, Agent, or Firm* — Valeo Systemes d'Essuyage

(57) ABSTRACT

The invention relates to a cleaning system suitable for being mounted on a motor vehicle and comprising at least one first and one second cleaning devices, each cleaning device comprising a cleaning liquid reservoir, at least one cleaning nozzle for spraying the cleaning liquid, a fluid distribution circuit arranged to convey cleaning liquid from the reservoir to the cleaning nozzle and a pump arranged to inject the cleaning liquid contained in the reservoir into the fluid distribution circuit, the cleaning system further comprising a bypass device connecting at least two cleaning devices by their respective fluid distribution circuits, comprising a backup line and a solenoid valve placed on the backup line, controlled as a function of the failure state of a pump, and arranged to supply the cleaning nozzle of one cleaning device from the reservoir of another cleaning device, each (Continued)

cleaning device comprising a non-return member between its reservoir and a point of connection to the bypass device.

15 Claims, 3 Drawing Sheets

(51) Int. Cl.
    *B60S 1/52*     (2006.01)
    *B60S 1/56*     (2006.01)

(56) References Cited

U.S. PATENT DOCUMENTS

| | | | |
|---|---|---|---|
| 2018/0370496 A1 | 12/2018 | Sykula et al. | |
| 2019/0161035 A1* | 5/2019 | Salter | B60S 1/50 |
| 2020/0189530 A1 | 6/2020 | Kubota et al. | |
| 2021/0054835 A1* | 2/2021 | Williams | F04B 49/065 |
| 2023/0059307 A1* | 2/2023 | Park | B60S 1/481 |

FOREIGN PATENT DOCUMENTS

| | | | | |
|---|---|---|---|---|
| DE | 10342715 A1 | | 4/2005 | |
| DE | 102018114891 A1 | | 12/2018 | |
| EP | 3640100 A1 | | 4/2020 | |
| FR | 2813259 A1 | | 3/2002 | |
| FR | 2898565 A1 | * | 9/2007 | ............ B60S 1/481 |
| JP | 2006207907 A | * | 8/2006 | |
| JP | 2013100077 A | | 5/2013 | |
| JP | 2014040230 A | | 1/2014 | |
| JP | 2020094624 A | | 6/2020 | |
| WO | 2014010578 A1 | | 1/2014 | |
| WO | WO-2015076785 A1 | * | 5/2015 | ............ E21B 43/26 |
| WO | 2020153081 A1 | | 7/2020 | |

OTHER PUBLICATIONS

European Patent Office, International Search Report (with English translation) and Written Opinion of corresponding International Application No. PCT/EP2021/076394, dated Dec. 22, 2021.

* cited by examiner

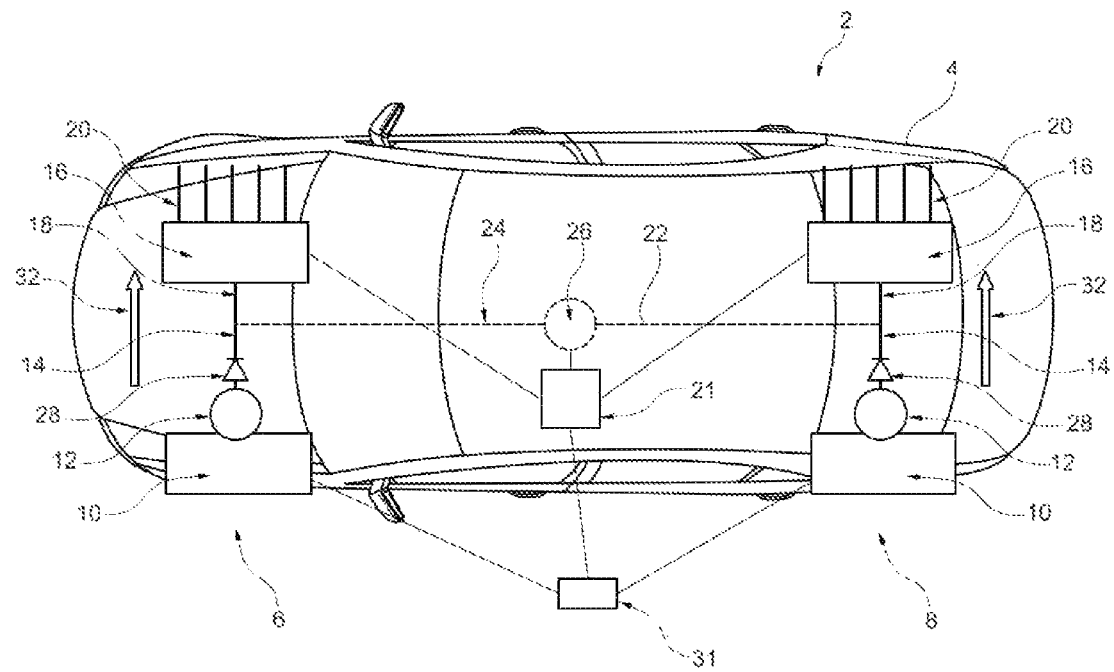
[Fig. 1]
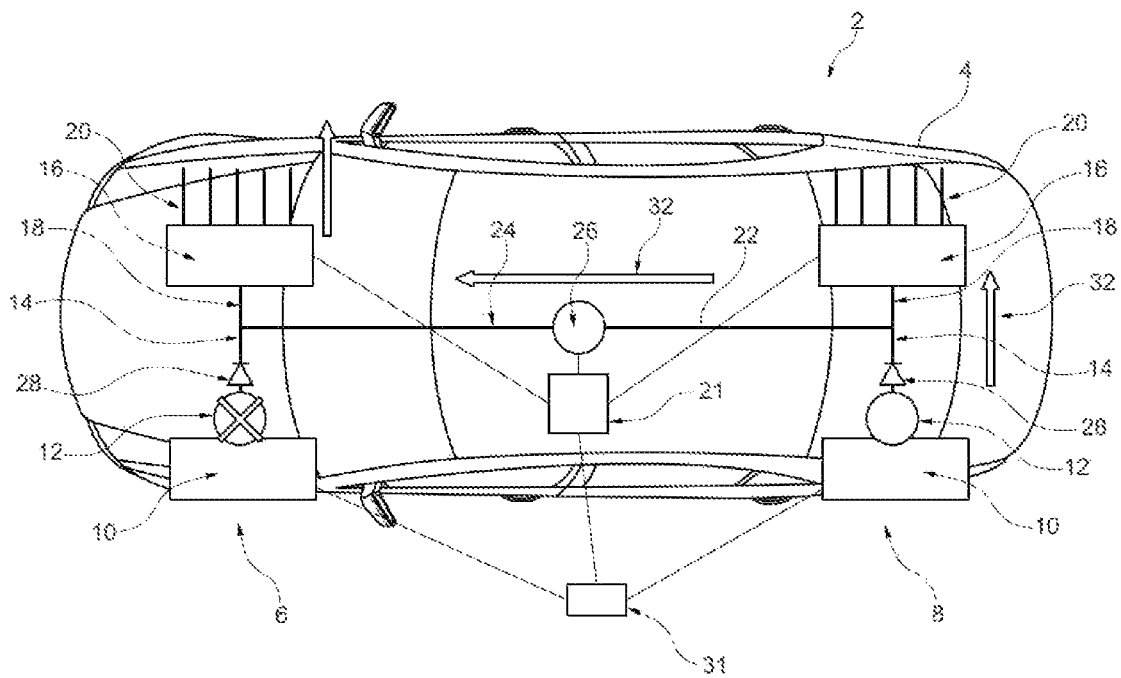
[Fig. 2]

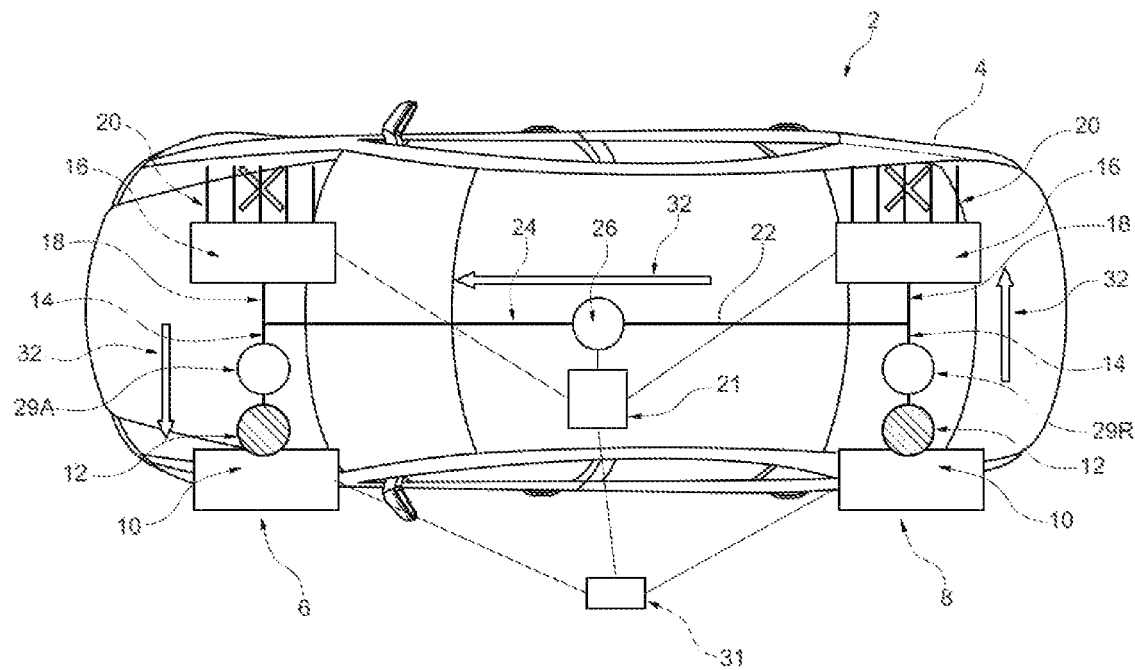
[Fig. 3]
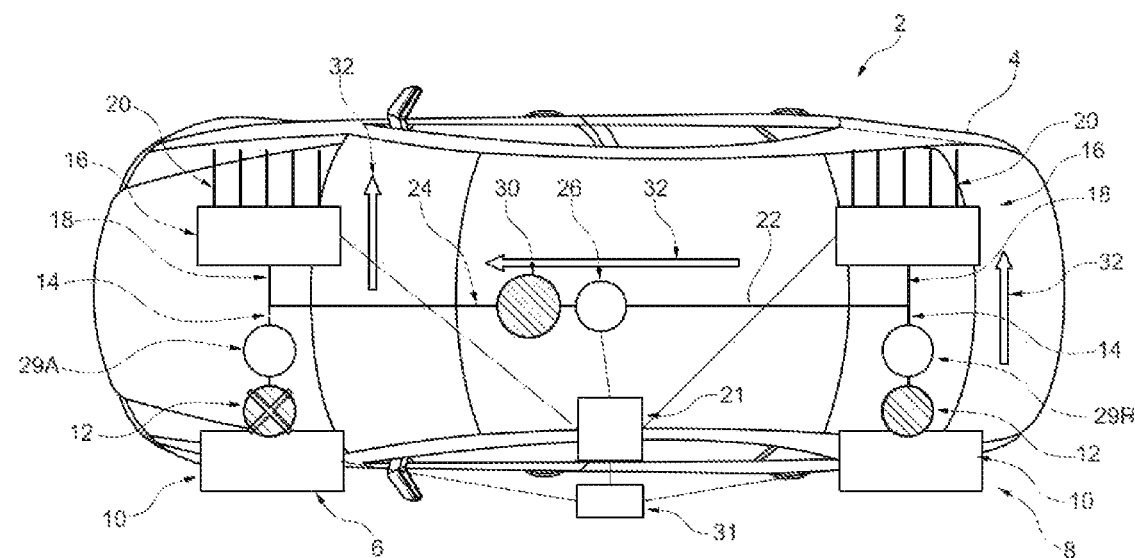
[Fig. 4]

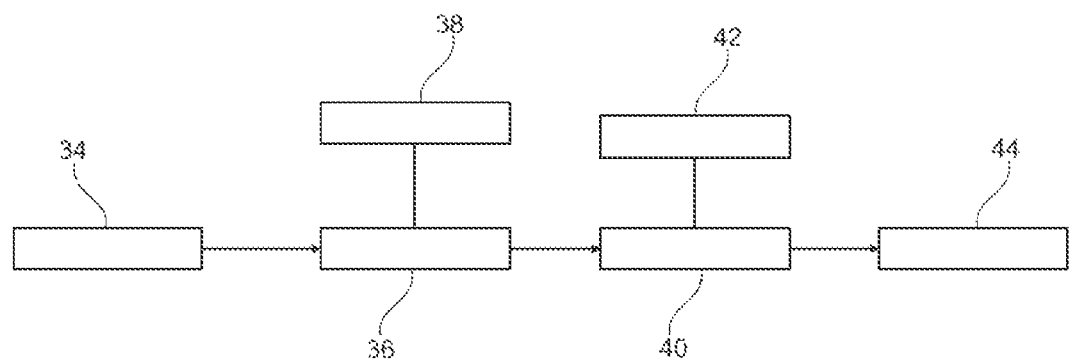
[Fig. 5]
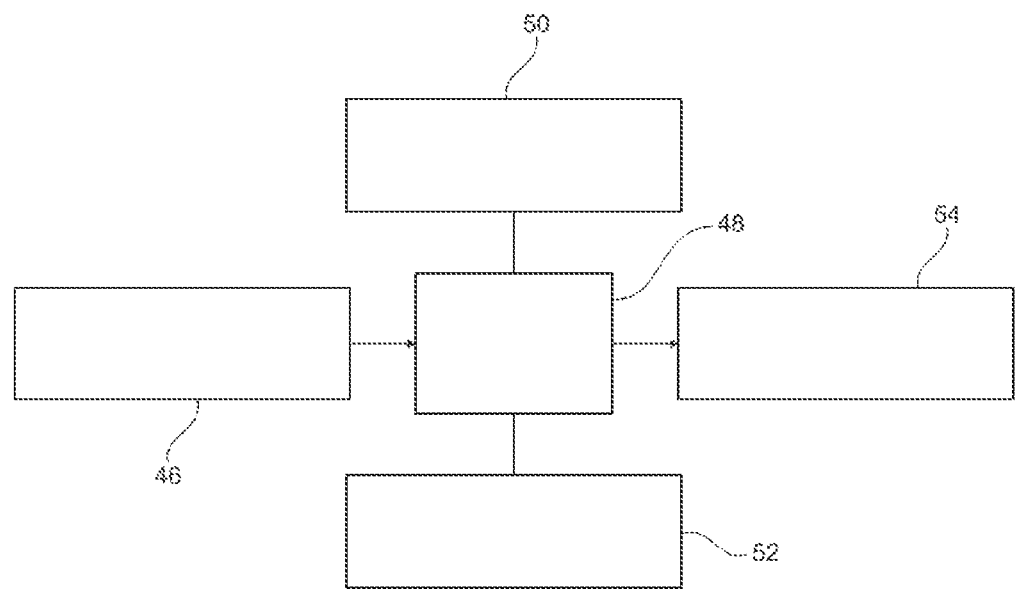
[Fig. 6]

CLEANING SYSTEM FOR A MOTOR VEHICLE

TECHNICAL FIELD

The invention relates to systems for cleaning a surface of a motor vehicle, in particular of motor vehicle sensors, suitable for being mounted on a motor vehicle, more particularly those comprising a plurality of cleaning devices.

BACKGROUND OF THE INVENTION

A number of motor vehicle sensors are positioned in areas where they are exposed to different types of dirt. They include for example the various driver assistance cameras or the distance sensors, ultrasonic sensors, radars, LIDAR sensors or rain sensors placed on the vehicle. There are a great many such sensors on autonomous vehicles which, by definition, must be capable of traveling without user intervention.

The aforementioned dirt can cause these sensors to malfunction. It is therefore necessary to provide a plurality of devices for cleaning them (distributed all over the vehicle) to ensure that they operate satisfactorily over time, for example one cleaning device placed at the front of the vehicle and another placed at the rear of the vehicle. It is also possible for frost formed on a sensor to cause it to malfunction.

Conventionally, such cleaning devices are made up of a reservoir in which cleaning liquid is stored, and a fluid distribution circuit made up of various pipes or tubes that make it possible to convey the cleaning liquid to at least one cleaning nozzle placed in front of a sensor so as to spray cleaning liquid onto it (as a general rule, there are a plurality of cleaning nozzles for a plurality of sensors).

A pump suitable for propelling cleaning liquid in the fluid distribution circuit to the cleaning nozzle is generally mounted directly on the reservoir. More specifically, a liquid intake tube of the pump is forced-fitted into an opening made in the reservoir (a seal is used to ensure that the assembly is leak-tight), and the liquid discharge orifice is connected to the fluid distribution circuit.

SUMMARY OF THE INVENTION

When the malfunctioning of a sensor due to the presence of dirt is detected (automatically, for example), the pump draws cleaning liquid from the reservoir, the liquid being at a similar pressure to atmospheric pressure (the pressure depends on the level of cleaning liquid in the reservoir), and propels it into the fluid distribution circuit at a higher pressure (the pressure difference depends on the capacity of the pump). The pressurized cleaning fluid is sprayed onto the sensor by the cleaning nozzle.

The various cleaning devices thus make it possible to clean all of the sensors on the vehicle to ensure optimum operation thereof.

It is for example possible for a vehicle to comprise two cleaning devices as described above, one placed at the front and the other at the rear of the vehicle. Each device comprises a cleaning liquid reservoir and at least one cleaning nozzle, the two being connected by a fluid distribution circuit. Each cleaning device comprises its own pump, making it possible to convey pressurized cleaning liquid to the cleaning nozzle(s). These cleaning devices operate independently of each other and clean surfaces at the front and rear of the vehicle respectively.

There is however a drawback of such a system, in particular in the event of a malfunction.

In the case of a vehicle comprising, as described above, two (or more than two) cleaning systems, one of the cleaning devices mounted on the vehicle stop might working due to the failure of the pump for propelling cleaning liquid into the fluid distribution circuit. No liquid can then be drawn from the reservoir to be conveyed to the cleaning nozzle(s) supplied by the failed pump. The operation of the sensors placed in a certain area of the vehicle (for example at the front or rear thereof) can then be impaired, which can become critical, in particular with respect to autonomous vehicles for which the satisfactory operation of the sensors is a major issue.

The invention aims in particular to provide a system for cleaning motor vehicle surfaces suitable for being mounted on a motor vehicle comprising means allowing operation, albeit downgraded, of a cleaning device with a fault on the pump for supplying the cleaning nozzle(s).

To this end, the invention relates to a cleaning system suitable for being mounted on a motor vehicle and comprising at least one first and one second cleaning devices, each cleaning device comprising a cleaning liquid reservoir, at least one cleaning nozzle for spraying the cleaning liquid, a fluid distribution circuit arranged to convey cleaning liquid from the reservoir to the cleaning nozzle and a pump arranged to inject the cleaning liquid contained in the reservoir into the fluid distribution circuit, the cleaning system further comprising a bypass device connecting at least two cleaning devices by their respective fluid distribution circuits, comprising a backup line and a solenoid valve placed on the backup line controlled as a function of the failure state of a pump, and arranged to supply the cleaning nozzle of one cleaning device from the reservoir of another cleaning device, each cleaning device comprising a non-return member between its reservoir and a point of connection to the bypass device.

It is thus possible to overcome a fault on a cleaning device by supplying it with the cleaning liquid of another cleaning device.

When all of the cleaning devices are working, the solenoid valve of the bypass device is closed and fluid communication between the cleaning devices is impossible.

However, when the pump of a cleaning device is no longer capable of sending cleaning liquid to the cleaning nozzle, this fault is detected (for example by self-diagnosis). The solenoid valve of the bypass device then opens and the operational pump of another cleaning device is activated to supply the cleaning nozzle(s) of the inoperative cleaning device. It is thus possible to ensure the operation, albeit downgraded, thereof. The presence of non-return members makes it possible to ensure that the cleaning liquid injected via the bypass device is correctly guided to the cleaning nozzles of the inoperative cleaning device.

According to further optional features of the cleaning system, taken individually or in combination:
  the first cleaning device is for example placed at the front of the motor vehicle and the second cleaning device is for example placed at the rear of the motor vehicle. The motor vehicle thus comprises different cleaning devices distributed as close as possible to the areas to be cleaned;
  the bypass device can comprise a two-way pump placed on the backup line. This pump thus makes it possible to avoid pressure drops when the cleaning liquid passes into the backup line to supply a failed cleaning device, regardless of which cleaning device has failed;

the non-return member can comprise a non-return valve. A simple assembly is thus obtained;

the non-return member can comprise a solenoid valve, preferably present on the pump arranged to inject the cleaning liquid contained in the reservoir into the fluid distribution circuit. The advantage of this solution lies in the fact that the solenoid valve can be closed in order to act as a non-return valve but also opened, for example to fill an empty reservoir of one cleaning device with cleaning liquid from the reservoir of another cleaning device;

the cleaning system can comprise more than two cleaning devices, wherein the fluid distribution circuit of one cleaning device can be connected to at least one fluid distribution circuit of other cleaning devices by means of a bypass device. It is thus possible to create pairs of cleaning devices, wherein each cleaning device can compensate for the failure of the other, or to connect all of the cleaning devices mounted on a motor vehicle;

each cleaning device can comprise a liquid distributor connecting a primary pipe coming from the pump to a series of secondary pipes coming from a plurality of cleaning nozzles, and a control unit configured to close the liquid distributor of one cleaning device as a function of the failure state of the pump of another cleaning device. Thus, in the event of the failure of the first cleaning device, the distributor of the second cleaning device, in particular solenoid valves present on this distributor, can be closed to ensure that all of the cleaning liquid drawn from the reservoir of the second cleaning device is sent to the fluid distribution circuit of the first cleaning device and to the cleaning nozzles thereof;

the cleaning system can comprise a circuit for monitoring an operating state of the first and second cleaning devices, and a control unit connected to the monitoring circuit and configured to open the solenoid valve of the bypass device. Automatic detection of the failure of a cleaning device and the activation of the bypass device in response to this diagnosis are thus obtained;

the monitoring circuit can be configured to detect a failure state of the pump of the first or second cleaning device. There is therefore a specific focus on the failure of the pumps used to draw cleaning liquid from the reservoirs of the cleaning devices;

the monitoring circuit can comprise one pressure sensor positioned upstream of the pump and another positioned downstream of the pump and upstream of the non-return member. This is an example of an assembly that makes it possible, for example, to register a lack of pressure downstream of the pump, indicating the failure thereof and therefore the failure of the cleaning device; and the monitoring circuit is in particular configured to detect that a liquid level inside the reservoir of the first or second cleaning device is below a predetermined threshold value. The filling of this reservoir by another reservoir can thus be envisaged for example in order to allow the cleaning device to continue operating. If the architecture of the cleaning system does not allow such filling, then the detection of an insufficient cleaning liquid level allows another cleaning device to supply the cleaning nozzles by means of the backup line.

The invention also relates to a method for cleaning motor vehicle sensors using the cleaning system according to the invention, comprising the following steps:

detecting the failure of the first cleaning device, commanding the opening of the solenoid valve of the bypass device, and commanding the starting of the pump of the second cleaning device in order to inject cleaning liquid in the backup line to the cleaning nozzle of the first cleaning device.

As explained above, it is thus possible to continue to operate a failed cleaning device, at least in degraded mode, by using another cleaning device to supply the fluid distribution circuit and the cleaning nozzles of the failed cleaning device.

According to further optional features of the cleaning method, taken individually or in combination:

the step of commanding the starting of the pump of the second cleaning device can be coupled with a command to start a two-way pump placed on the backup line. The operation of two pumps in series thus makes it possible to limit or even compensate for the pressure drops due to the flow of the cleaning liquid from the reservoir of the second cleaning device to the cleaning nozzles of the first cleaning device;

the method can comprise a step of closing a liquid distributor of the second cleaning device connecting a primary pipe coming from the pump of the second cleaning device to a series of secondary pipes coming from a plurality of cleaning nozzles of the second cleaning device after the failure of the first cleaning device has been detected. Thus, in the event of the failure of the first cleaning device, the distributor of the second cleaning device, in particular solenoid valves present on this distributor, can be closed to ensure that all of the cleaning liquid drawn from the reservoir of the second cleaning device is sent to the fluid distribution circuit of the first cleaning device and to the cleaning nozzles thereof;

the failure of the first cleaning device can be detected by a circuit for monitoring an operating state of the first and second cleaning devices, the command to open the solenoid valve of the bypass device being controlled by a control unit. Automatic detection of the failure of a cleaning device and the activation of the bypass device in response to this diagnosis are thus obtained;

the monitoring circuit can detect the failure of the pump of the first cleaning device. There is therefore a specific focus on the failure of the pumps used to draw cleaning liquid from the reservoirs of the cleaning devices; and the failure of the pump of the first cleaning device can be detected by pressure measurements taken by one pressure sensor positioned upstream of the pump and another positioned downstream of the pump and upstream of the non-return member. This is an example of an assembly that makes it possible, for example, to register a lack of pressure downstream of the pump, indicating the failure thereof and therefore the failure of the cleaning device.

BRIEF DESCRIPTION OF DRAWINGS

The invention will be better understood on reading the following description, provided purely by way of example and with reference to the appended drawings, in which:

FIG. 1 is a schematic depiction of the cleaning system according to the invention, comprising first and second cleaning devices in an operational state;

FIG. 2 is a schematic depiction of the cleaning system in FIG. 1, wherein the first cleaning device has failed;

FIG. 3 is a schematic depiction of the cleaning system in FIG. 1, illustrating the filling of a reservoir of the first cleaning device from the second cleaning device;

FIG. 4 is a schematic depiction of the cleaning system according to a variant of the invention, wherein the first cleaning device has failed;

FIG. 5 is a schematic depiction of the different steps of the cleaning method according to the invention in the event of the failure of a cleaning device; and FIG. 6 is a schematic depiction of the different steps of the cleaning method in the event of the filling of a reservoir of one cleaning device from another cleaning device.

DETAILED DESCRIPTION OF THE INVENTION

The embodiments described with reference to the figures are examples. Although the description refers to one or more embodiments, this does not necessarily mean that each reference relates to the same embodiment, or that the features apply only to one embodiment. Individual features of various embodiments may also be combined to create other embodiments.

The terms "upstream" and "downstream" are used to locate the elements/devices in the direction of conveyance of the stream of material to be processed. A first device or element, for example a pump, is thus situated upstream of a second device or element if the material is processed first by the first device and then by the second device.

Reference is now made to FIG. 1, which shows a cleaning system 2 mounted on a motor vehicle 4. The aim of this cleaning system 2 is to make it possible to clean various surfaces of the motor vehicle 4 such as for example sensors mounted on the vehicle, or the windshield or rear window. The figures contain arrows 32 illustrating the direction of flow of the cleaning liquid as a function of the operational state of the cleaning system 2.

In the example illustrated, the cleaning system comprises a first cleaning device 6 placed at the front of the vehicle and a second cleaning device 8 placed at the rear of the vehicle.

Each cleaning device comprises a cleaning liquid reservoir 10 on which is a pump 12 is mounted. The pump 12 is mounted in a recess of the reservoir 10 for accommodating the pump 12, the reservoir 10 comprising an orifice through which an intake tube of the pump 12 is mounted, with a seal at the interface between the reservoir 10 and the pump 12 around the orifice in order to ensure that the assembly is leak-tight. As is conventional, the pump 12 is a standard pump comprising a tubular main body for example. This main body can be made up of a pumping first portion and a driving second portion comprising an electric motor. The pumping first portion comprises a liquid intake tube and a liquid discharge tube so that it can receive cleaning liquid from the reservoir 10 and discharge it at a higher pressure than the intake pressure of the pump 12. The liquid intake tube can be placed at a free end of the pumping first portion and be coaxial with the main body of the pump 12, sharing the same axis of revolution as it. The driving second portion can extend from the pumping first portion in a direction perpendicular to the axis of revolution of the main body.

The driving second portion can be situated above the pumping first portion and comprise an electric motor and, at its free end, a connector making it possible to connect the pump 12 to an electrical power source.

A plurality of cleaning nozzles (not shown in the figures) are situated at the other end of the cleaning devices 6 and 8 and suitable for being placed in front of a surface of the motor vehicle to be cleaned in order to spray pressurized cleaning liquid onto it.

Each cleaning device further comprises pipes (or tubes) connecting the different members (pump 12, cleaning nozzle, etc.) to each other to form a fluid distribution circuit 14.

If a single reservoir 10 supplies a plurality of cleaning nozzles, each cleaning device can comprise a liquid distributor 16 that makes it possible to connect a primary pipe 18 coming from the pump 12 to a series of secondary pipes 20 coming from a plurality of cleaning nozzles, as illustrated in the figures. Conventionally, the cleaning device can comprise one or more solenoid valves to allow or prevent the supply to the secondary pipes 20. The presence can be envisaged of a solenoid valve on the primary pipe at the intake of the liquid distributor 16 to control the supply to all of the secondary pipes 20 or solenoid valves on each secondary pipe 20 for specific control of the supply to each cleaning nozzle. Any type of solenoid valve can be used, for example a normally open or closed solenoid valve.

The cleaning system can also comprise a control unit 21 making it possible to control the opening and closing of the liquid distributor, for example of the solenoid valves, for example in order to switch off the supply to the cleaning nozzles of an operational cleaning device in order to ensure that the cleaning liquid of this device is redirected to a failed cleaning device.

The cleaning system 2 further comprises a bypass device 22 connecting the two cleaning devices 6 and 8 by their respective fluid distribution circuits 14.

The bypass device 22 comprises a backup circuit 24 connecting the fluid distribution circuit 14 of the first cleaning device 6 to the fluid distribution circuit 14 of the second cleaning device 8, preferably between the pump 12 and the liquid distributor 16 of each cleaning device. Fluid communication is thus established between the two cleaning devices, making it possible to supply one with the cleaning liquid stored in the reservoir 10 of the other.

The bypass device 22 also comprises a solenoid valve 26 placed on the backup line 24 and controlled as a function of the failure state of a pump. In other words:

the solenoid valve 26 is closed when the two cleaning devices are operational in order to prevent fluid communication between them, as can be seen in FIG. 1, but the solenoid valve 26 is open when one of the two cleaning devices has failed, in order to allow the operational cleaning device to operate the other, at least in degraded mode, as can be seen in FIGS. 2, 3 and 4.

Any type of solenoid valve can be used, for example a normally closed solenoid valve.

If the number of cleaning devices is greater than two, it is possible to ensure that each cleaning device is connected to one or more other cleaning device(s), and the connection of all of the cleaning devices to each other by means of bypass devices 22 can even be envisaged.

Each cleaning device comprises a non-return member 28 between its reservoir 10 and a point of connection to the bypass device.

According to a first variant shown in FIGS. 1 to 3, the non-return member 28 comprises a non-return valve that only allows the passage of liquid coming from the pump 12 of the cleaning device in question. This is a simple way to prevent the cleaning liquid coming from an operational cleaning device from being returned to the reservoir 10 of a failed cleaning device.

According to a second variant illustrated in FIG. 4, as well as in FIG. 3, the non-return member 28 comprises one solenoid valve 29, 29A for the front cleaning device and 29R for the rear cleaning device, present on the pump arranged to inject the liquid contained in the reservoir 10 into the fluid distribution circuit (not illustrated in the figures). The advantage of this variant lies in having a dynamic system. In other words:

when the cleaning device is operating, the solenoid valve 29 is open to allow through the cleaning liquid coming from the reservoir 10, and the solenoid valve 26 is closed, when the cleaning device has failed, in particular the pump has failed, the solenoid valve 29 is closed to prevent the cleaning liquid coming from an operational cleaning device from being returned to the reservoir 10 of a failed cleaning device, and the solenoid valve 26 is open, and if it is necessary to fill the cleaning liquid reservoir 10 of a cleaning device, but the pump 12 is operational, the solenoid valve 29 is open to allow the cleaning liquid coming from another cleaning device to reach the reservoir 10. The control unit 21 of the liquid distributor can close it in order to prevent cleaning liquid from being discharged by the cleaning nozzles of the cleaning device the reservoir 10 of which is to be filled. The liquid distributor 16 of the cleaning device from which liquid is drawn is also closed for the same reasons.

With respect to this possibility of filling the reservoir 10 illustrated in FIG. 3 for the first reservoir, it is possible for the cleaning system 2 to comprise a monitoring circuit 31 configured to detect that a liquid level inside the reservoir 10 of the first or second cleaning device is below a predetermined threshold value, for example comprising a probe measuring the liquid level inside a reservoir 10. On detection of an insufficient liquid level, the reservoir 10 could then be filled with cleaning liquid coming from another cleaning device by activating the pump 12 thereof, opening the solenoid valve 26 of the bypass device 22 and opening the solenoid valve 29A forming a non-return member. As illustrated in FIG. 3, the valve(s) of the liquid distributors 16 of the two cleaning devices are closed in order to prevent any discharge of cleaning liquid by the cleaning nozzles when this is not desired.

If the non-return member 28 comprises a non-return valve, an insufficient liquid level can then be likened to a failure resulting in another cleaning device supplying the cleaning nozzles.

In the variant illustrated in FIG. 4, the bypass device further comprises a two-way pump placed on the backup line. As explained above, this makes it possible to overcome the pressure drops due to the flow of the cleaning liquid from the reservoir 10 of an operational cleaning device to the cleaning nozzles of a failed cleaning device, regardless of which cleaning device has failed. It would even be possible, as a function of the capacity of the two-way pump 30, to ensure that the nozzle outlet pressure was greater than the outlet pressure of the pump 12 of the operational cleaning device. If there is no two-way pump 30, it is nevertheless possible to ensure at least downgraded operation of the failed cleaning device.

As explained above, the cleaning system can comprise a monitoring circuit 31 for measuring the filling level of the reservoirs 10 of the first and second cleaning devices 6 and 8. Obviously, this monitoring circuit 31 can be used to monitor the operating state of the first and second cleaning devices and therefore detect the failure of a cleaning device.

For example, the monitoring circuit 31 can be configured specifically to detect a failure state of the pump 12 of the first or second cleaning device 6 or 8. It is possible for the monitoring circuit 31 to comprise one pressure sensor positioned upstream of the pump 12 and another positioned downstream of the pump 12 and upstream of the non-return member 28. If a lack of pressure increase downstream of the pump 12 is registered, then the failure of the cleaning device is registered.

The monitoring circuit 31 can be connected to the control unit 21. Then, the observation of a failure by the monitoring circuit 31 is communicated to the control unit 21, which opens the solenoid valve 26 and can also start the pump of an operational cleaning device connected to the failed cleaning device.

A mode of operation of the cleaning system as described above will be described with reference to FIG. 2 and FIG. 4 (variant comprising a solenoid valve 26 on the backup line 24 and solenoid valves forming non-return members 28) in the event of the failure of the first cleaning device 6. The operating mode is the same for the failure of the second cleaning device 8. FIG. 5 illustrates the different steps of this operating mode.

The first step 34 consists of detecting a failure, for example of the first cleaning device 6. This failure can in particular be detected by the monitoring circuit 31. This can be detection as described above, with sensors present upstream and downstream of the pump 12 or a probe measuring the liquid level inside the reservoir 10. At this stage, an anomaly resulting in the failure of the first cleaning device 6 has been diagnosed.

The second step 36 is the command to open the solenoid valve 26 of the bypass device 22, for example from the control unit 21 coupled to the monitoring circuit. This opening command depends on the type of solenoid valve used. A step 38 of closing the liquid distributor 16 of the second cleaning device 8 can also be envisaged at this moment, as well as the solenoid valve 29 forming a non-return member 28 of the first cleaning device 6. At this stage, the bypass device 22 can convey liquid from the second cleaning device 8 to the first cleaning device 6. If the liquid distributor 16 of the second cleaning device 8 has been closed, together with the possible solenoid valve 29 forming a non-return member 28 on the first cleaning device 6, then everything is ready for the injection of liquid from the second cleaning device 8 to the first cleaning device 6. Step 36 and optional step 38 therefore make it possible to prepare for the redirection of the cleaning liquid.

The third step 40 is the command to start the pump 12 of the or one of the second cleaning device(s) 8 in order to inject cleaning liquid in the backup line 24 to the cleaning nozzles of the first cleaning device 6. If a two-way pump 30 is present on the backup line 24 as illustrated in FIG. 4, then the backup line is preferably activated in a synchronized manner with the pump 12 of the second cleaning device 8 (step 42 of the method). The liquid distributor 16 of the second cleaning device 8 and the solenoid valve 29 forming a non-return member 28 on the first cleaning device 6 can be closed during this step. Cleaning liquid is thus drawn from the reservoir 10 of the second cleaning device 8 and injected to the cleaning nozzles of the first cleaning device 6 by means of the backup line 24 of the bypass device 22.

Following this series of steps 34, 36 and 40 and when the operation of the first cleaning device is no longer necessary, for example after a repair or maintenance operation, the solenoid valve 26 can be switched back to the closed state, the two-way pump 30 can be deactivated, together with the pump 12 of the second cleaning device 8, and all of the members that were closed are reopened in order to restore the status quo ante (step 44 of return to the initial situation).

If the filling of the reservoir 10 of the first cleaning device 6 is required with cleaning liquid coming from the reservoir 10 of the second cleaning device 8 (illustrated in FIG. 6), the following steps are carried out:

step 46 of detecting a cleaning liquid level below a predetermined threshold value in the reservoir 10 of the first cleaning device 6, for example by a probe of the monitoring circuit, step 48 of commanding the opening of the solenoid valve 26 and potential closing of the liquid distributors 16 of the first and second cleaning devices 6 and 8 (step 50), the solenoid valve forming a non-return member 28 on the first cleaning device 6 being open (passively or actively depending on the type of solenoid valve, step 52), step 54 of commanding the starting of the pump 12 of a second cleaning device 8 in order to inject cleaning liquid in the backup line 24 to the reservoir 10 of the first cleaning device 6.

LIST OF REFERENCES

2: cleaning system
4: motor vehicle
6: first cleaning device
8: second cleaning device
10: reservoirs
12: pumps
14: fluid distribution circuits
16: liquid distributors
18: primary pipe
20: secondary pipes
21: control unit
22: bypass device
24: backup line
26: solenoid valve of the bypass device
28: non-return member
29, 29A, 29R: solenoid valves forming a non-return member
30: two-way pump
31: monitoring circuit
32: direction of cleaning liquid
34: detection of failure of the first cleaning device
36, 48: command to open the solenoid valve of the bypass device
38: closing of the liquid distributor of the second device and of the solenoid valve forming a non-return member of the first device
54: command to start the pump of the second device
42: activation of the two-way pump
44: return to the initial situation
46: detection of a cleaning liquid level below a threshold value
50: closing of the liquid distributors of the first and second devices
52: opening of the solenoid valve forming a non-return member of the first device

What is claimed is:

1. A cleaning system suitable for being mounted on a motor vehicle and comprising:
   a first and second cleaning device, wherein each cleaning device includes a reservoir;
   a cleaning nozzle for spraying a cleaning liquid;
   a fluid distribution circuit arranged to convey the cleaning liquid from the reservoir to the cleaning nozzle and a pump arranged to inject the cleaning liquid contained in the reservoir into the fluid distribution circuit;
   a bypass device connecting each cleaning device by each respective fluid distribution circuit that includes a backup line;
   a solenoid valve placed on the backup line controlled as a function of a failure state of the pump of each cleaning device, the solenoid valve arranged to supply the cleaning nozzle of one cleaning device from the reservoir of the other cleaning device;
   wherein each cleaning device includes a non-return member between the respective reservoir and point of connection to the bypass device.

2. The cleaning system of claim 1, wherein the first cleaning device is placed at a front of the motor vehicle and the second cleaning device is placed at a rear of the motor vehicle.

3. The cleaning system of claim 1, wherein the bypass device includes a two-way pump placed on the backup line.

4. The cleaning system of claim 1, wherein each non-return member includes a non-return valve.

5. The cleaning system of claim 1, wherein each non-return member includes a solenoid valve on the pump arranged to inject the cleaning liquid contained in the associated reservoir into the respective fluid distribution circuit.

6. The cleaning system of claim 1 including more than two cleaning devices, wherein the fluid distribution circuit of one cleaning device is connected to a fluid distribution circuit of one of the other cleaning devices by means of a bypass-type device.

7. The cleaning system of claim 1, wherein each cleaning device includes a liquid distributor connecting a primary pipe coming from the pump to a series of secondary pipes coming from a plurality of cleaning nozzles; and
   a control unit configured to close the liquid distributor of one cleaning device as a function of the failure state of the pump of the other cleaning device.

8. The cleaning system of claim 1, including a circuit for monitoring an operating state of the first and second cleaning devices, and a control unit connected to a monitoring circuit and configured to open the solenoid valve of the bypass device.

9. The cleaning system of claim 8, wherein the monitoring circuit is configured to detect the failure state of the pump of the first cleaning device or the second cleaning device.

10. The cleaning system of claim 9, wherein the monitoring circuit includes one pressure sensor positioned upstream of the respective pump and another pressure sensor position downstream of the respective pump and upstream of the non-return member.

11. The cleaning system of claim 8, wherein the monitoring circuit is configured to detect that a liquid level inside the reservoir of the first or second cleaning device is below a predetermined threshold value.

12. A method for cleaning motor vehicle sensors using the cleaning system of claim 1, comprising the following steps:
   detecting a failure of the first cleaning device;
   commanding the opening of the solenoid valve of the bypass device, and
   commanding the starting of the pump of the second cleaning device in order to inject cleaning liquid in the backup line to the cleaning nozzle of the first cleaning device.

13. The cleaning method of claim 12, wherein the step of commanding the starting of the pump of the second cleaning device is coupled with a command to start a two-way pump placed on the backup line.

14. The cleaning method of claim 12, comprising
a step of closing a liquid distributor of the second cleaning device connecting a primary pipe coming from the pump of the second cleaning device to a series of secondary pipes coming from a plurality of cleaning nozzles of the second cleaning device after the failure of the first cleaning device has been detected.

15. The cleaning method of claim 12, wherein the failure of the first cleaning device is detected by a circuit for monitoring an operating state of the first and second cleaning devices, the command to open the solenoid valve of the bypass device being controlled by a control unit.

\* \* \* \* \*